United States Patent [19]

Park et al.

[11] Patent Number: 5,441,919
[45] Date of Patent: * Aug. 15, 1995

[54] CERAMIC FOAMS

[75] Inventors: Eugene S. Park, Hockessin, Del.; Steven D. Poste, Kingston, Canada

[73] Assignee: Lanxide Technology Company, LP, Newark, Del.

[ * ] Notice: The portion of the term of this patent subsequent to Oct. 29, 2008 has been disclaimed.

[21] Appl. No.: 210,843

[22] Filed: Mar. 21, 1994

Related U.S. Application Data

[63] Continuation of Ser. No. 14,959, Feb. 8, 1993, Pat. No. 5,296,416, which is a continuation of Ser. No. 783,284, Oct. 28, 1991, Pat. No. 5,185,297, which is a continuation of Ser. No. 494,124, Mar. 15, 1990, Pat. No. 5,061,660, which is a continuation of Ser. No. 278,207, Nov. 30, 1988, abandoned, which is a continuation of Ser. No. 89,376, Aug. 26, 1987, Pat. No. 4,808,558, which is a continuation-in-part of Ser. No. 908,116, Sep. 16, 1986, abandoned.

[51] Int. Cl.⁶ .............................................. C04B 38/00
[52] U.S. Cl. .................................... 501/80; 501/85; 501/98; 501/127
[58] Field of Search ............................ 501/8, 85, 98, 127

[56] References Cited

U.S. PATENT DOCUMENTS

| | | | |
|---|---|---|---|
| 2,741,822 | 4/1956 | Udy | 25/157 |
| 3,255,027 | 6/1966 | Talsma | 106/65 |
| 3,296,002 | 1/1967 | Hare | 106/40 |
| 3,298,842 | 1/1967 | Seufert | 106/65 |
| 3,419,404 | 12/1968 | Mao | 106/65 |
| 3,421,863 | 1/1969 | Bawa et al. | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,789,096 | 1/1974 | Church | 264/60 |
| 3,864,154 | 2/1975 | Gazza et al. | 29/123 B |
| 3,973,977 | 8/1976 | Wilson | 106/62 |
| 4,258,099 | 3/1981 | Narumiva | 501/80 X |
| 4,808,558 | 2/1989 | Park et al. | 501/80 |
| 4,833,106 | 5/1989 | Horie | 501/80 |
| 5,061,660 | 10/1991 | Park et al. | 501/80 |
| 5,185,297 | 2/1993 | Park et al. | 501/80 |
| 5,296,416 | 5/1994 | Park et al. | 501/80 |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |
| 0193292 | 3/1986 | European Pat. Off. . |

OTHER PUBLICATIONS

"Oxidation of Molten Aluminum Alloys, Reaction with Refractories"—M. Drouzy and M. Richard—Mar., 1974 Fonderies, France No. 332 pp. 121–128.

"Refractories for Aluminum Alloy Melting Furnaces'-'—B. Clavaud and V. Jost—Sep., 1980—Lillian Brassinga (from French) Jan., 1985.

*Primary Examiner*—Karl Group
*Attorney, Agent, or Firm*—Mark G. Mortenson; Kevin J. Boland

[57] ABSTRACT

Ceramic foams in which the open cells are connected by a three-dimensional, substantially continuous ceramic matrix formed of interconnected hollow ligaments, are made from an open-cell, reticulated precursor metal, i.e. a metal foam. The precursor metal first is treated so as to allow a support coating to form thereon, and thereafter the coated precursor is heated above the melting point of the metal in the presence of an oxidant to form an oxidation reaction product.

15 Claims, 1 Drawing Sheet

CERAMIC FOAMS

This is a continuation of application Ser. No. 08/014,959 filed on Feb. 8, 1993, which issued on Mar. 22, 1994, as U.S. Pat. No. 5,296,416, which was a continuation of U.S. Ser. No. 07/783,284, filed Oct. 28, 1991, which issued Feb. 9, 1993, as U.S. Pat. No. 5,185,297, which was a continuation of U.S. Ser. No. 07/494,124, filed Mar. 15, 1990, which issued Oct. 29, 1991, as U.S. Pat. No. 5,061,660, which was a continuation of U.S. Ser. No. 07/278,207, filed Nov. 30, 1988, and now abandoned, which was a continuation of U.S. Ser. No. 07/089,376, filed Aug. 26, 1987, which issued Feb. 28, 1989, as U.S. Pat. No. 4,808,558, which was a continuation-in-part of U.S. Ser. No. 06/908,116, filed Sep. 16, 1986, and now abandoned.

FIELD OF THE INVENTION

The present invention relates to ceramic products having a ceramic skeletal structure, i.e. rigid foams, and, more particularly, to ceramic products having a three-dimensional skeletal structure of randomly interconnected cells or channels. The invention relates also to the method of forming such products.

BACKGROUND AND DESCRIPTION OF THE PRIOR ART

Open-cell ceramic foams are commercially desirable for use in a variety of products including filters for molten metals, diesel particulate traps, catalytic converters for automotive exhaust treatment, heat exchangers, heating elements, thermal and electric insulators, etc. In addition to the outstanding high-temperature and chemical resistance afforded by the ceramic, and the benefit of the foam's high degree of porosity and large surface area for such products as filters and catalyst supports, the high strength-to-weight ratio achievable with ceramic foams is an attractive advantage in components for automobiles, aircraft, etc.

In the conventional manufacture of ceramic bodies, including ceramic foams, a number of process steps are required, e.g., grinding, sizing, consolidating, sintering, machining, etc. At each step, inhomogeneities and impurities can be introduced, which may have a deleterious effect on the end product. Another important criterion, which is not feasible with conventional processing, is the ability to manufacture such ceramic bodies in near-final configuration (near net shape), including intricate shapes.

As is described in U.S. Pat. No. 3,947,363, granted Mar. 30, 1976, to M. J. Pryor et al., open-cell ceramic foams can be prepared from an open-cell, hydrophilic flexible organic foam material having a plurality of interconnected voids surrounded by a web of the foam material. The organic foam material is impregnated with an aqueous ceramic slurry so that the web is coated, and the voids are filled, with slurry. Then the slurry-impregnated material is compressed to expel 20–75% of the slurry, and the pressure thereafter is released so that the web remains coated with slurry. After drying, the material is heated, first to burn out the flexible organic foam and then to sinter the ceramic coating, thereby leaving a consolidated ceramic foam having a plurality of interconnected voids surrounded by a web of bonded or fused ceramic in the configuration of the precursor organic foam. With this organic-to-ceramic technique, it has been reported to be necessary to take steps to overcome problems of product non-uniformity caused by a non-uniform distribution of slurry resulting when the organic foam body is compressed by passage through rolls, by excessive handling of organic foam slabs, etc.

In a variation of the above-described process set forth in U.S. Pat. No. 4,076,888, granted Feb. 28, 1978, to G. Perugini et al., a metal, metal/ceramic, and/or ceramic coating is applied to a foamed polyurethane sponge via an electroconducting film (e.g., electroless nickel or copper plating) previously applied to the sponge. A galvanic coating is described as being applied over the electroconducting film, followed by a molten-spray coating of metal/ceramic or ceramic applied by means of a $10,000°$–$15,000°$ C. argon plasma flame. The final web is described as being hollow and multi-layered in structure and gradually changing from metallic on the inside to an external ceramic character. The molten-spray coating technique is stated to be applicable only to sponges no thicker than 12 mm if the spray can be applied on one face only, and no thicker than 25 mm if spraying can be applied to two opposite sides.

About ten years earlier. U.S. Pat. Nos. 3,255,027 (granted Jun. 7, 1966, to H. Talsma), 3,473,938 (granted Oct. 21, 1969, to R. E. Oberlin), and 3,473,987 (granted Oct. 21, 1969, to D. M. Sowards) had disclosed a method of making thin-walled alumina-containing structures by firing, in an oxygen-containing atmosphere, thin aluminum sections (such as cans, tubes, boxes, arrays of tubes, honeycombs, etc., or crumpled forms, made from aluminum sheets or formed by extrusion methods), coated with an oxide of an alkali metal, alkaline earth metal, vanadium, chromium, molybdenum, tungsten, copper, silver, zinc, antimony, or bismuth, or precursor thereof as a fluxing agent, and, optionally, a particulate filler refractory. As applied to honeycomb structures, the process was reported to form double-walled sections of refractory having a sheet-like void near the center, said to have resulted from the migration of molten aluminum through fissures in the oxide film formed on the surface of the metal. Oberlin showed this structure to be weak, and described eliminating the double-walled structure by using a vanadium compound and a silicate fluxing agent in the process. Sowards pre-coated the structure with aluminum powder prior to firing, thereby producing the double-walled structure with thicker walls. Only aluminum template structures fabricated from sheets or formed by extrusion were contemplated.

As is stated by Talsma, the interconnected walls of a honeycomb define closed cells or channels longitudinally extending the entire length of the walls. The channels are aligned so as to be parallel to a single common axis, a structure which is less useful for certain purposes than that of open-cell foams, in which the cellular structure is three-dimensional. For example, the particulate collecting efficiency of a ceramic honeycomb filter disposed in an exhaust passage of a diesel engine has been reported to be low (U.S. Pat. No. 4,540,535), and honeycomb catalyst supports have been reported as suffering from a relatively low geometric area and undesirably low turbulence (U.S. Pat. No. 3,972,834).

Co-assigned U.S. patent application Ser. No. 818,943, filed on Jan. 15, 1986, now U.S. Pat. No. 4,713,360, issued on Dec. 15, 1987, in the name of Newkirk et al., describes a generic process for producing ceramic products by the directed oxidation of molten precursor metal. In this process, an oxidation reaction product forms initially on the surface of a body of molten parent metal exposed to an oxidant, and then grows from that surface by transport of additional molten metal through the oxidation reaction product where it reacts with the oxidant. The process may be enhanced by the use of alloyed dopants such as in the case of an aluminum parent metal oxidized in air. This method was improved by the use of external dopants applied to the surface of the precursor metal as disclosed in co-assigned U.S. patent application Ser. No. 220,935, filed Jun. 23, 1988, now U.S. Pat. No. 4,853,352, issued on Aug. 1, 1989, which is a Continuation of application Ser. No. 822,999, filed Jan. 17, 1986, in the name of Newkirk et al. In this context, oxidation has been considered in its broadest sense, to mean one or more metals giving up electrons to, or sharing electrons with, another element or combination of elements to form a compound. Accordingly, the term "oxidant" denotes an electron acceptor or sharer.

In the process described in co-assigned U.S. patent application Ser. No. 819,397, filed Jan. 17, 1986, now U.S. Pat. No. 4,851,375, issued on Jul. 25, 1989, to Newkirk et al., ceramic composite products are produced by growing a ceramic product in a bed of filler material adjacent to a body of molten parent metal. The molten metal reacts with a gaseous oxidant, such as oxygen, which has been allowed to permeate the filler bed. The resultant oxidation reaction product, e.g. alumina, can grow into and through the mass of filler as molten parent metal is drawn continuously through fresh oxidation reaction product. The filler particles are embedded within the polycrystalline ceramic product comprising the oxidation reaction product interconnected in three dimensions.

Another co-assigned U.S. patent application Ser. No. 823,542, filed Jan. 27, 1986, now U.S. Pat. No. 4,828,785, issued on May 9, 1989 to Newkirk et al., describes a method of making ceramic composite articles, including tubes, by growing a ceramic product in a permeable bed of filler material which surrounds a mold or pattern of parent metal defining a shape to be inversely replicated as a cavity in the ceramic composite article. The metal mold (e.g., a shaped aluminum rod), embedded in the filler (e.g., a permeable mass of alumina or silicon carbide particles), becomes molten, and the molten parent metal resets with an oxidant such as oxygen, which has been allowed to permeate the adjacent filler bed. The resultant oxidation reaction product, e.g. alumina, can grow into and through the mass of filler as molten parent metal is drawn through fresh oxidation reaction product. When the molten metal in the space originally occupied by the metal mold has been consumed, there remains a cavity that inversely replicates the shape or geometry of the original metal mold, with the cavity being surrounded by the resulting ceramic composite.

These oxidation reaction processes by directed oxidation provide a diversity of shaped ceramic articles, but heretofore have not been applied to producing rigid ceramic foams. Ceramic foams have a distinctive physical structure which imparts many beneficial properties and uses thereto. This structure is characterized by open cells or channels interconnected randomly in three dimensions, affording a high surface area per unit volume end high strength-to-weight ratio. Turbulent fluid flow results from these three-dimensional cellular structures, which can be advantageous in some applications, and is in contrast to the laminar flow in a honeycomb. A need exists for improvements in such products, and in methods of making them.

SUMMARY OF THE INVENTION

The present invention provides a ceramic foam comprising a reticulated body of open cells or open channels which are interconnected randomly in three dimensions, and a substantially continuous ceramic material. In accordance with the invention, a metallic foam is utilized as precursor metal from which is derived an oxidation reaction product. The foam is a reticulated body of interlacing ligaments, veins, fibers, ribbons, or the like, of precursor metal interconnected randomly in three dimensions thereby defining open cells or channels. The channels, as defined by the external surfaces of the ligaments, likewise are interconnected randomly in three dimensions. In producing the ceramic foam, the metal reticulum serves as the precursor metal or parent metal, and it is at least partially consumed in the formation of oxidation reaction product. The reticulated body of parent metal is first treated in a manner such that a support coating, capable per se of maintaining the integrity of the open-cell structure of the body under the process conditions, forms on the surfaces of ligaments at a temperature below the melting point of the metal. This support coating may be intrinsically formed or be externally applied, as described below in detail. The coated parent metal body is then heated at a temperature above the melting point of the metal whereby molten metal contacts and reacts with an oxidant and forms an oxidation reaction product. The process conditions are maintained to draw parent metal through the oxidation reaction product which, on contact with the oxidant, forms additional oxidation reaction product. The process is continued until the desired coating of polycrystalline ceramic is formed, which comprises oxidation reaction product and, optionally, metallic constituents and/or pores. The ceramic foam product comprises an open-cell, reticulated ceramic structure, and substantially all or only part of the metallic ligaments may be consumed in the process.

In accordance with one embodiment of the invention, the foam metal ligaments are pre-coated with a permeable layer of filler material which is substantially inert under the process conditions. During processing, the resultant ceramic oxidation reaction product, e.g. alumina, infiltrates and grows into and through the permeable layer as molten metal is drawn through fresh oxidation reaction product. Thus, there is formed a ceramic matrix composite within which filler particles are embedded. The matrix is comprised of a three-dimensionally interconnected polycrystalline material of oxidation reaction product and filler material, and further may include metallic constituents such as nonoxidized parent metal and/or pores. The oxidation reaction product is interconnected in three dimensions. The metal component may be interconnected or isolated. Likewise, the pores may be interconnected or isolated.

The product of the invention comprises a reticulated body of open cells interconnected randomly in three dimensions defined by a substantially continuous ceramic matrix having the structure of interlaced, three-dimensionally, randomly interconnected hollow ligaments or tubules. Depending on the process conditions, the hollow ligaments may be substantially empty of parent metal, or may be partially filled with parent metal thereby providing a metal core for the ceramic matrix. In some instances, both empty and metal-containing hollow ligaments may be present in the ceramic foam product. The ceramic article substantially replicates the configuration of the original metal cellular body thereby producing an article of near net shape. In this way, a ceramic product of desired near net shape, as well as tailored density, composition and properties may be achieved. Moreover, the relatively simple and limited number of processing steps lends itself to the production of high-purity ceramic bodies and further eliminates many conventional processing defects.

The metallic component in the wall portion of the hollow ligaments, and also the metal core, may be desirable for uses in which thermal or electrical conductivity are required, e.g., for heat exchangers, heating elements, etc. Also, the metal can improve the strength or toughness, which may be of value in filters, strainers, etc.

As used in this specification and the appended claims, the terms below are defined as follows:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents and/or porosity (interconnected and isolated) derived from the parent metal, or reduced from the oxidant or a dopant, most typically within a range of from about 1–40% by volume, but may be higher.

"Foam" as applied to both the precursor metal or to the product refers to a self-supporting body possessing a cellular, skeletal, web-like structure.

"Oxidation reaction product" generally means one or more metals in any oxidized state wherein a metal has given up electrons to or shared electrons with another element, compound, or combination thereof. Accordingly, an "oxidation reaction product" under this definition includes the product of reaction of one or more metals with an oxidant, such as those described in this application.

"Oxidant" means one or more suitable electron acceptors or electron sharers and may be a solid, a liquid or a gas (vapor) or some combination of these (e.g., a solid and a gas) at the process conditions.

"Parent metal" or precursor metal is intended to refer to relatively pure metals, commercially available metals with impurities and/or alloying constituents therein, and alloy s and intermetallic compounds of the metals. When a specific metal is mentioned, the metal identified should be read with this definition in mind unless indicated otherwise by the context.

BRIEF DESCRIPTION OF THE DRAWINGS

In the accompanying drawing.

DETAILED DESCRIPTION

Figure 1:
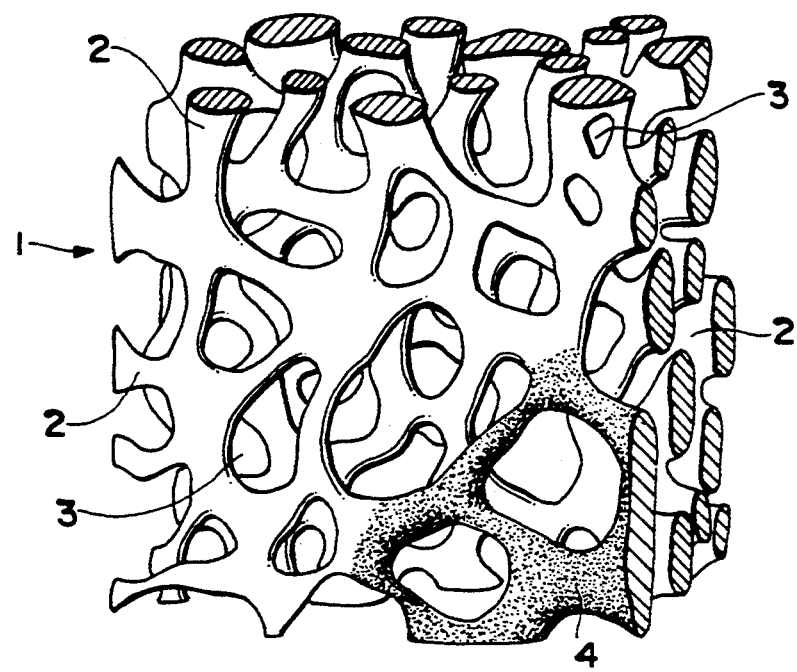
FIG. 1 is a sectional representation of the precursor metal foam showing its three-dimensional network of randomly interconnected ligaments and open cells, and partially coated with a layer of material useful in forming a support coating.

In the process of the present invention, the formation and growth of the ceramic product is carried out on an open-cell parent metal body having a three-dimensional cellular structure, i.e., a metal foam or sponge. Because of the complexity of this structure, the limited accessibility to its interior surfaces, and the fineness of the supporting structure, special conditions are required to accomplish the conversion of an open-cell metal body to an open-cell ceramic body by the growth process. In accordance with the process, the open-cell parent metal body serves as a pattern or mold for the formation of a similarly configured ceramic foam body. Despite the structural complexity of the parent metal body, and the molten condition and displacement of the metal during the process, the integrity and configuration of the original open-cell structure of the parent metal body is substantially retained. The present invention provides this advantage in forming shaped ceramic bodies in that the metal foam can be readily shaped, including forming cavities, in contrast to machining the finished ceramic article, which more difficult and costly. The outside dimensions and configuration of the metal foam are substantially replicated by the finished ceramic because the metal ligament or vein has a relatively small cross-sectional dimension and therefore growth of the oxidation reaction product does not substantially alter the dimensions of the body.

The parent metal body is first treated to produce a support coating on the metal ligaments, which coating, per se, maintains the integrity of the open-cell structure. The support coating may be permeable to the gaseous oxidant if used, or contains a solid or liquid oxidant, and permits infiltration and growth of an oxidation reaction product. This treatment to provide a support coating is below the melting point of the parent metal, and treatment can be accomplished in any one of various ways. In accordance with one embodiment of the invention, the support coating is intrinsically formed by oxidation of the precursor metal below its melting point to form a layer of oxidation reaction product. In the intrinsic forming of the support coating, it is preferable to conduct the heat-up to the low temperature region at a slow rate. Where desired, the metal foam can be heated to the low temperature at a relatively rapid rate and then soaked at the required temperature for sufficient time to form the coating. In some systems, the preheat step alone is acceptable. For example, in the procedure described in Example 1 which follows, if the metal foam comprises 6101 aluminum alloy, when heated in air for two hours at 600° C., a sufficient support coating is formed comprising a thin support coating of aluminum oxide. Similarly, when relatively pure aluminum is heated in a nitrogen atmosphere at 650° C. for several hours, a thin support coating of aluminum nitride is formed, as illustrated in Example 11 below. This support coating should be of sufficient thickness to support and maintain the integrity and configuration of the original metal foam structure. During the subsequent heating step above the melting point of the parent metal, the foam will not collapse because of the support coating. The oxidation reaction process proceeds, and oxidation reaction product is grown or developed to the desired thickness for the ceramic foam product.

In an alternative method of pretreating the foam to provide a support coating, a material, or its precursor, which reacts or is decomposable below the metal's melting point to form a permeable support coating, is applied to the foam metal surfaces prior to heating. In such a case employing this external application, as is shown in Examples 2-10, the support coating can form during ramp heat-up from a temperature below the melting point of the parent metal to a temperature above its melting point, without the need for a hold-time at the premelting temperature. Examples of coating materials, or their precursors, particularly useful with an aluminum parent metal system are metallic salts and compounds, including organometallic compounds, of alkali, alkaline-earth and transition metals, and slurries or slips of alumina, very fine aluminum powder, silica, silicon carbide, aluminum nitride, silicon nitride, boron carbide, or any combination thereof. A dopant material may be used in conjunction with the metal, as described below in detail. Also, fillers may be applied to the surfaces of the metal ligaments so that a ceramic composite is formed. Suitable fillers, depending on the ceramic matrix composition to be formed, may include the carbides of silicon, aluminum, boron, hafnium, niobium, tantalum, thorium, titanium, tungsten, vanadium, and zirconium; the nitrides of silicon, aluminum, boron, hafnium, niobium, tantalum, thorium, titanium, uranium, vanadium, and zirconium; the borides of chromium, hafnium, molybdenum, niobium, tantalum, titanium, tungsten, vanadium, and zirconium; end the oxides of aluminum, beryllium, cerium, chromium, hafnium, iron, lanthanum, magnesium, nickel, titanium, cobalt, manganese, thorium, copper, uranium, yttrium, zirconium, and silicon.

After the parent metal body has been properly pretreated to form the permeable support coating, the temperature of the parent metal is raised to a region above its melting point but below the melting point of the oxidation reaction product. In the case of aluminum parent metal, having a dopant used in conjunction therewith, this temperature interval may range from about 690°-1450° C., and preferably 900°-1350° C. The molten metal adjacent the coating reacts with the oxidant, which in the case of a gas has permeated the coating, or with any solid and/or liquid oxidant present in the support coating. Upon heating, oxidation reaction product is formed when molten parent metal contacts the oxidant, and molten metal will be drawn through the newly formed oxidation reaction product to cause the formation and continued growth of oxidation reaction product at the surface exposed to the oxidant. In such a case, the metal originally present as the precursor metal may be essentially completely transported out of its original location (ligaments enveloped by the support coating) so that the resulting product comprises randomly interconnected ceramic hollow ligaments or tubules having a bore of substantially the same size (diameter) as that of the original metal ligament. The ceramic tubules or hollow ligaments comprise a polycrystalline material consisting essentially of oxidation reaction product and optionally metallic constituents and/or pores. If the process is conducted to convert substantially all of the parent metal to oxidation reaction product, interconnected porosity will develop in place of the interconnected metallic component, and there may still be isolated metal and/or pores.

By controlling the process conditions, such as time, temperature, type of parent metal and dopants, a portion only of the molten metal may be converted into the oxidation reaction product, and a core of re-solidified parent metal will remain in the tubules or hollow ligaments.

Figure 2:
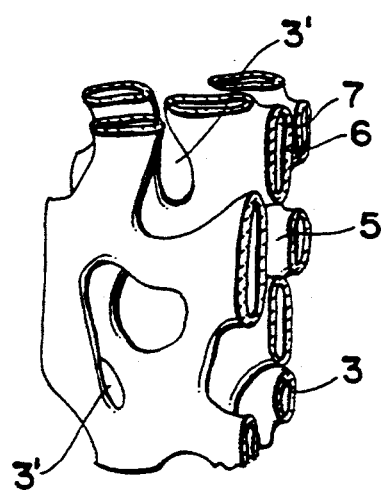
FIG. 2 is a sectional view through a fragment of ceramic product made in accordance with the invention.

Referring to FIG. 1, there is shown a metal sponge, indicated generally by the numeral 1, having ligaments or veins 2. A coating 4 has been applied to a portion of the ligaments interconnected to form a three-dimensional reticulated structure having open cells 3, which interconnect randomly in three dimensions by virtue of the three-dimensional ligament structure. Cells 3 are generally polygonal in shape, but may be non-angular, e.g. oval or circular. FIG. 2 shows the ceramic product made in accordance with the invention, and shows hollow ligaments or tubules 5 of ceramic material and open cells 3.

Figure 2A:
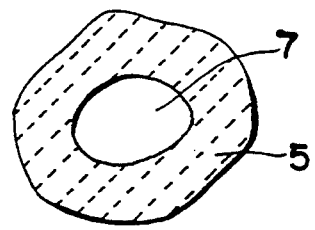
FIG. 2A is a transverse cross-section through an empty ceramic tubule in the product shown in FIG. 1.
Figure 2B:
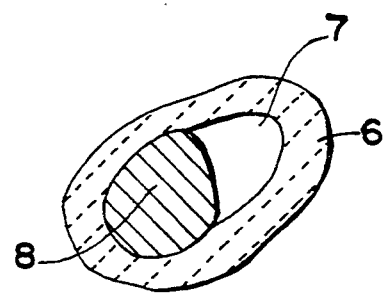
FIG. 2B is a transverse cross-section of a ceramic tubule with metal core in a product of the invention.

The ceramic ligaments 5 shown in cross-section in FIGS. 2 and 2A are substantially hollow, the toroidal surface formed by sectioning through the walls of said tubules being denoted by the numeral 6. These tubules have hollow bores 7, which can add to the lightness of the product as well as its surface area per unit volume. The tubule shown in FIG. 2B has a ceramic wall 6 and a metal core 8 resulting from incomplete conversion of the parent metal to the oxidation reaction product. Also, the metal core typically does not completely fill the interior of the ligament, resulting in some void volume 7.

A particularly useful metal foam as the precursor metal for use in the present process is the metal foam known as Duocel, a product of Energy Research and Generation, Inc., Oakland, Calif., USA. This product is described as a foam metal having a reticulated structure of open, dodeca-hedronal-shaped cells connected by continuous, solid-metal ligaments. It should be understood, however, that the source and form of the precursor metal is not essential to the practice of the invention so long as it is cellular in structure. One means in producing a suitable metal foam is to cast molten metal with an expendable or fugitive material. For example, molten aluminum is cast around granules of salt, or around particles of coke such as used in fluidized beds. Upon cooling of the metal, the salt is removed by leaching with water, or the coke is removed by controlled low temperature oxidation reaction. Where desired, a metal foam may comprise a consolidated mass of metal fibers of desired bulk density to provide an open network of interstitial voids.

Aluminum is a preferred parent metal for use in the present process. It is readily available in foam metal form, such as Duocel, and is particularly well-adapted for use in processes wherein a molten parent metal is to be drawn into, or through, an oxidation reaction product for reacting with an oxidant.

However, as is mentioned in the foregoing co-pending, co-assigned patent applications, parent metals other than aluminum can be employed in these ceramic growth processes, and these include such metals as titanium, tin, zirconium, and hafnium. All such metals can be used in the present process if they are available, or can be made available, in open-cell, i.e., foam, metal form.

Although solid, liquid, and vapor-phase oxidants may be employed in the present process, the molten metal usually will be heated in a reactive atmosphere, e.g., air or nitrogen in the case of aluminum. The support coating is gas-permeable so that upon exposure of the coated precursor to the atmosphere, the gas permeates the coating to contact the molten parent metal adjacent thereto.

A solid oxidant may be employed by dispersing it through the precursor material for the support coating. A solid oxidant may be particularly useful in forming the support coating or in forming a relatively thin ceramic matrix.

A solid, liquid or vapor-phase oxidant, or a combination of such oxidants, may be employed, as noted above. For example, such typical oxidants include, without limitation, oxygen, nitrogen, a halogen, sulphur, phosphorus, arsenic, carbon, boron, selenium, tellurium, and compounds and combinations thereof, for example, methane, ethane, propane, acetylene, ethylene, propylene (the hydrocarbon as a source of carbon), and mixtures such as air, $H_2/H_2O$ and $CO/CO_2$, the latter two (i.e., $H_2/H_2O$ and $CO/CO_2$) being useful in reducing the oxygen activity of the environment.

Although any suitable oxidants may be employed, a vapor-phase oxidant is preferred, but it should be understood that two or more vapor-phase oxidants may be used in combination. If a vapor-phase oxidant is used in conjunction with a material for the support coating which may include a filler, the coating is permeable to the vapor-phase oxidant so that upon exposure to the oxidant, the vapor-phase oxidant permeates the coating to contact the molten parent metal. The term "vapor-phase oxidant" means a vaporized or normally gaseous material which provides an oxidizing atmosphere. For example, oxygen or gas mixtures containing oxygen (including air) are preferred vapor-phase oxidants, as in the case where aluminum is the parent metal, with air usually being more preferred for obvious reasons of economy. When an oxidant Is Identified as containing or comprising e particular gas or vapor, this means an oxidant in which the identified gas or vapor is the sole, predominant or at least a significant oxidizer of the parent metal under the conditions obtaining in the oxidizing environment utilized. For example, although the major constituent of air is nitrogen, the oxygen content of air is the sole oxidizer for the parent metal because oxygen is a significantly stronger oxidant than nitrogen. Air there fore falls within the definition of an "oxygen-containing gas" oxidant but not within the definition of a "nitrogen-containing gas" oxidant. An example of a "nitrogen-containing gas" oxidant as used herein and in the claims is "forming gas" which typically contains about 96 volume percent nitrogen and about 4 volume percent hydrogen.

When a solid oxidant is employed in conjunction with the support coating, it is usually dispersed through the coating, or its precursor and also filler if used, in the form of particulates, or perhaps as coatings on the filler particles. Any suitable solid oxidant may be employed including elements, such as boron or carbon, or reducible compounds, such as silicon dioxide or certain borides of lower thermodynamic stability than the boride reaction product of the parent metal. For example, when boron or a reducible boride is used as a solid oxidant for an aluminum parent metal the resulting oxidation reaction product is aluminum boride.

In some instances, the oxidation reaction may proceed so rapidly with a solid oxidant that the oxidation reaction product would tend to fuse due to the exothermic nature of the process. Such an occurrence could degrade the micro-structural uniformity of the ceramic body. This rapid exothermic reaction is avoided by mixing into the composition a relatively inert filler which exhibits low reactivity. An example of such a suitable inert filler is one which is identical to the intended oxidation reaction product.

If a liquid oxidant is employed, in conjunction with the support coating and the filler, the entire coating or filler may be impregnated with the oxidant. Reference to a liquid oxidant means one which is a liquid under the oxidation reaction conditions and so a liquid oxidant may have a solid precursor, such as a salt, which is molten at the oxidation reaction conditions. Alternatively, the liquid oxidant may have a liquid precursor, e.g., a solution of a material which is melted or decomposed at the oxidation reaction conditions to provide a suitable oxidant moiety. Examples of liquid oxidants as herein defined include low-melting glasses.

As is described in the aforementioned co-assigned U.S. patent applications, certain parent metals under specific conditions of temperature and oxidizing atmosphere meet the criteria necessary for the ceramic process with no special additions or modifications. However, dopant materials used in combination with the parent metal can favorably influence or promote the process. The dopant or dopants may be provided as alloying constituents of the parent foam metal, or may be supplied by the support coating. In some instances the dopant may be omitted depending on process temperatures and parent metal. By way of illustration, when a reticulated aluminum body is heated in a nitrogen atmosphere to form aluminum nitride, a dopant material is preferred or required if the process temperature is about 1200° C., but no dopant need be used when processing commercially pure aluminum at a temperature of about 1700° C.

Useful dopants for an aluminum parent foam metal, particularly with air as the oxidant, include, for example, magnesium metal and zinc metal, particularly in combination with other dopants, such as silicon, described below. These metals, or a suitable source of the metals, may be alloyed into the aluminum-based parent foam metal at concentrations for each of between about 0.1 and 10% by weight based on the total weight of the resulting doped metal. The concentration range for any one dopant will depend on such factors as the combination of dopants and the process temperature. Concentrations within this range appear to initiate the ceramic growth from molten metal, enhance metal transport, and favorably influence the growth morphology of the resulting oxidation reaction product.

Other dopants which are effective in promoting ceramic growth from molten metal, for aluminum-based parent metal systems are, for example, silicon, germanium, tin, end lead, especially when used in combination with magnesium or zinc. One or more of these other dopants, or a suitable source of them, is alloyed into the aluminum foam parent metal system at concentrations for each of about from 0.5 to 15% by weight of the total alloy; however, more desirable growth kinetics and growth morphology are obtained with dopant concentrations in the range of about 1–10% by weight of the total parent metal alloy. Lead as a dopant is generally alloyed into the aluminum-based parent metal at a temperature of at least 1000° C. so as to make allowances for its low solubility in aluminum; however, the addition of other alloying components, such as tin, will generally increase the solubility of lead and allow the alloying materials to be added at a lower temperature.

One or more dopants may be used depending upon the circumstances. For example, in the case of an aluminum parent metal and with air as the oxidant, particularly useful combinations of dopants include (a) magnesium and silicon or (b) magnesium, zinc and silicon. In such examples, a preferred magnesium concentration falls within the range of about from 0.1 to 3% by weight, for zinc in the range of about from 1 to 6% by weight, and for silicon in the range of about from 1 to 10% by weight. Useful dopants in forming aluminum nitride include calcium, barium, silicon, magnesium and lithium.

Additional examples of dopant materials, useful with an aluminum parent metal, include sodium, germanium, tin, lead, lithium, calcium, boron, phosphorus, and yttrium which may be used individually or in combination with one or more dopants depending on the oxidant and process conditions. Sodium and lithium may be used in very small mounts in the parts per million range, typically about 100-200 parts per million, and each may be used alone or together, or in combination with other dopant(s). Rare earth elements such as cerium, lanthanum, praseodymium, neodymium, and samarium are also useful dopants, and herein again especially when used in combination with other dopants.

An external dopant may be applied by soaking the parent open-cell metal body in an aqueous solution of a salt of the dopant metal (Example 2), or by dipping the parent open-cell metal body in an organic slurry of the dopant powder, followed by shaking to disperse the slurry throughout the open-cell skeleton structure. The quantity of external dopant is effective over a wide range relative to the amount of parent metal to which it is applied. For example, when utilizing silicon in the form of silicon dioxide externally applied as the dopant for an aluminum-based parent metal using air or oxygen as the oxidant, quantities as low as 0.0001 gram of silicon per gram of parent metal together with a second dopant providing a source of magnesium and/or zinc produce the ceramic growth phenomenon. It also has been found that a ceramic structure is achievable from an aluminum-based parent metal containing silicon as an alloyed dopant using air or oxygen as the oxidant by adding MgO as an external dopant in an amount greater than about 0.0005 gram of dopant per gram of parent metal to be oxidized and greater than about 0.005 gram of dopant per square centimeter of parent metal surface upon which the MgO is applied.

The invention is illustrated by the following examples.

EXAMPLE 1

The foam metal used as the starting material was a 5.1 cm × 5.1 cm × 2.5 cm block of the previously mentioned Duocel, made, in this case, of 6101 aluminum alloy. The major alloying constituents in this metal are silicon (0.3-0.7%), magnesium (0.35-0.8%), and iron (0.5% maximum). Elements present in amounts of 0.1% or less include copper, zinc, boron, manganese, and chromium. The foam metal is described by the manufacturer as having a reticulated structure of open, dodechedral-shaped cells connected by continuous, solid aluminum alloy ligaments. Its cell size was 4 pores per centimeter (mean cell size of 0.20 cm).

The metal foam block was preconditioned by sequential cleaning treatments in acetone and in a 20% aqueous sodium chloride solution for about 2 minutes per treatment. The block then was placed on top of a bed of wollastonite in a refractory crucible.

The crucible was placed in a furnace where it was heated in air to a temperature of 600° C. over a 2-hour heat-up period, and then maintained at 600° C. for 2 hours. This heating step permitted the formation of a permeable coating on the foam metal surfaces sufficient per se to maintain the reticular integrity of the metal block. At this point, the furnace temperature was increased up to 1300° C. over a 2.3-hour period, and was maintained there for 15 hours.

The product was removed from the wollastonite bed after the crucible and its contents had been allowed to cool to ambient temperature, had a rigid open-cell structure like that of Duocel, but dull finish and gray color. There was essentially no reduction in its size (compared to the Duocel), indicating that the integrity of the open-cell structure of the foam metal had been retained despite the fact that the product had been held above the melting point of the 6101 aluminum alloy for more than 15 hours. Photo-micrographs of the web-forming ligaments in cross-section showed a partially metal-filled tubular structure, i.e. a metal core surrounded by a ceramic sheath. X-ray diffraction studies established that the sheath comprised a matrix of three-dimensionally interconnected alumina containing dispersed aluminum metal. The core was aluminum. The sheath, i.e., the tubular wall, was hard and electrically conducting.

EXAMPLE 2

(a) The procedure described in Example 1 was repeated with the exception that the preconditioned Duocel block was soaked in a 20% aqueous solution of magnesium nitrate and dried, and the 600° C. preheat step was omitted. The coated foam metal was heated in air for 4 hours until a temperature of 1300° C. was reached, and then maintained at 1300° C. for 15 hours.

The external appearance and size of the cooled product were like those of the product formed according to Example 1, but, in this case, the cross-sectional photo-micrographs of the web-forming ligaments revealed a tubular structure having a hollow core and a thicker wall than the product described in Example 1. The diameter of the hollow core was essentially the same as that of the ligaments in the Duocel used. The wall consisted essentially of an alumina matrix containing dispersed aluminum metal. A magnesium aluminate spinal also was present.

(b) Analogous results were obtained when the foregoing procedure was repeated except for the substitution of colloidal silica for the magnesium nitrate solution.

The application of a magnesium nitrate solution or colloidal silica to the foam metal prior to heating to a temperature above the melting point of the aluminum alloy permitted the formation of a support coating during the heat-up time, thus obviating the need for a holding time at selected premelting temperature. Moreover, the magnesia and silica coatings subsequently acted as dopants and enhanced the growth rate of alumina via the transport of molten aluminum through freshly formed alumina, with the result that essentially all of the aluminum originally present in the Duocel was displaced and oxidized in the oxidizing atmosphere so as to form the alumina ceramic sheath.

EXAMPLE 3

Alumina powder in a 1-5μ particle size range was slurried in a 20% solution of a nitrile rubber in cyclohexanone. A preconditioned Duocel block such as that described in Example 1 was dipped into the slurry and shaken so as to deposit a permeable layer of alumina on the metal surfaces. The coated block was heated according to the procedure described in Example 2. During the heating in the oxidizing atmosphere, molten aluminum was drawn into, and oxidized in and adjacent the permeable alumina coating, forming an open-cell product in which the nature of the web-forming ligaments was that of a metal-filled tubular structure, i.e., an aluminum core surrounded by a sheath of an alumina matrix with aluminum metal dispersed therein. The sheath was hard and electrically conducting.

EXAMPLE 4

(a) The procedure described in Example 3 was repeated with the exception that 1–10μ aluminum, instead of alumina, powder was coated onto the Duocel from the nitrile rubber solution. The fine aluminum powder was readily oxidized on the metal surfaces during heat-up so as to form a permeable alumina coating sufficient to maintain the reticular integrity of the foam metal block before the melting point of aluminum was reached. Photomicrographs of the resulting web-forming ligaments revealed a ceramic tubular structure having an aluminum core. The wall was formed of an alumina ceramic containing dispersed aluminum metal.

(b) Results analogous to those reported in Paragraph (a) were obtained when the heating was effected in nitrogen gas instead of air, the tubular wall in that case being made of aluminum-bearing aluminum nitride.

(c) Results analogous to those reported in Paragraph (a) were obtained when the procedure described in Example 3 was repeated except that the alumina powder described therein and the aluminum powder described in Paragraph (a) above were both pre-coated onto the Duocel. The ceramic wall comprised alumina/aluminum when the heating was carried out in air, and aluminum nitride/alumina/aluminum when the heating was carried out in nitrogen.

EXAMPLES 5–10

In the following examples, the procedure described in Example 3 was repeated with variations in the compositions of the coatings applied to the Duocel foam block prior to the ceramic-forming heating step. In each case, the nature of the ligaments in the resulting ceramic foam was that of a tubular structure, i.e., a tubule of a ceramic composite material which comprised a metal-bearing ceramic matrix having embedded therein, in granular form, the ceramic material(s) present in the support coating. In some instances, the tubules had metal cores, and, in others, they were hollow (with a diameter essentially the same as that of the metal ligaments in the Duocel used), depending on processing time, and whether or not an external dopant (as illustrated in Example 2) had been used.

| Example | Powder Applied Before Heating | Heating Atmosphere | Sheath Composition |
| --- | --- | --- | --- |
| 5(a) | Al/SiO$_2$ | Air | Al$_2$O$_3$/Al/Si |
| 5(b) | Al/SiO$_2$ | N$_2$ | AlN/Al/Si/Al$_2$O$_3$ |
| 6(a) | SiC | Air | SiC/Al$_2$O$_3$/Al |
| 6(b) | SiC | N$_2$ | SiC/AlN/Al |
| 7(a) | Al/SiC | Air | Al$_2$O$_3$/Al/SiC/Si |
| 7(b) | Al/SiC | N$_2$ | AlN/Al/SiC |
| 8(8) | AlN | Air | Al$_2$O$_3$/Al/AlN |
| 8(b) | AlN | N$_2$ | AlN/AL |

-continued

| Example | Powder Applied Before Heating | Heating Atmosphere | Sheath Composition |
| --- | --- | --- | --- |
| 9(a) | AL/AlN | Air | Al$_2$O$_3$/Al/AlN |
| 9(b) | AL/AlN | N$_2$ | AlN/AL |
| 10(a) | B$_4$C | N$_2$ | AlN/Al/B$_4$C |
| 10(b) | B$_4$C/Al | N$_2$) | AlN/Al/B$_4$C |

EXAMPLE 11

Two aluminum foam bodies (of 99.7% purity) were prepared and used as the preforms to produce aluminum nitride bodies in accordance with the invention. The first aluminum foam preform was prepared by casting molten aluminum around sodium chloride granules and then removing the salt by leaching in water. The second preform was made by pressure casting molten aluminum around fluid coke particles which were subsequently removed by heating in air.

In each case, after removal of the sodium chloride or coke particles, the porous aluminum foam body was subject to heating in a nitrogen atmosphere. The heating schedule was as follows:

(1) heat from 20° C. to 650° C. over 2 hours
(2) hold ("soak") at 650° C. for 16 hours
(3) heat from 650° C. to 1700° C. over 5 hours
(4) soak at 1700° C. for 2 hours
(5) shut off furnace and cool to about room temperature.

It was found that by providing a long, relatively low-temperature soak in nitrogen at 650° C. (just below the melting point of aluminum), the structural integrity of the metal foam was maintained upon further heating to the final temperature of 1700° C. and the external dimensions of the foam remained essentially unchanged. No dopant was used. Physical measurements of the starting preform (green sample) and final product (fired sample), in the operation using the preform prepared by casting on fluid coke particles, are given below:

| Measurement Sample | Green Sample | Fired Product |
| --- | --- | --- |
| Weight (g) | 1.62 | 2.31 |
| Volume (g/cm$^3$) | 2.31 | 2.25 |
| Bulk Density (g/cm$^3$) | 0.69 | 1.00 |
| Apparent Porosity (%) | 73.2 | 47.3 |
| True Porosity (%) | 74.6 | 69.2 |

X-ray diffraction analysis of the fired sample showed essentially pure aluminum nitride. The theoretical weight gain is 52% for conversion from aluminum to aluminum nitride, and the result for this run was about 42.6%.

It is to be understood that the invention is not limited to the features and embodiments hereinabove specifically set forth, but may be carried out in other ways without departure from its spirit.

We claim:

1. A rigid ceramic foam comprising a reticulated body of interlacing hollow ligaments derived from precursor metal ligaments said hollow ligaments interconnected randomly in three dimensions, the external surfaces of said ligaments defining open channels interconnected randomly in three dimensions, and said hollow ligaments comprising a polycrystalline ceramic material formed in situ and consisting essentially of (i) the oxidation reaction product of said precursor metal reacted with at least one of a solid oxidant and a liquid oxidant and, optionally, (ii) metallic constituents.

2. A ceramic foam of claim I wherein said ceramic material comprises three-dimensionally interconnected aluminum oxide containing, optionally, aluminum.

3. A ceramic foam of claim I wherein said ceramic material comprises three-dimensionally interconnected aluminum nitride containing, optionally, aluminum.

4. A ceramic foam of any of claim 1, wherein said ceramic material includes at least one filler material incorporated therein.

5. A ceramic foam of claim 1 wherein said hollow ligaments are substantially free of any metallic core of precursor metal.

6. A ceramic foam of claim 1 wherein said hollow ligaments contain a core of precursor metal along with some void volume.

7. A ceramic foam of claim 1 wherein some of said hollow ligments are substantially hollow and some contain core of precursor metal.

8. A ceramic foam of claim 4, wherein said at least one filler comprises at least one member of the group consisting of metal oxides, nitrides, borides, and carbides.

9. A ceramic foam of claim 8, wherein said at least one fill, is selected from the group consisting of silicon carbide, silicon nitride, aluminum nitride, and alumina.

10. The ceramic foam of claim 1, wherein said precursor metal comprises at least one of the group consisting of aluminum, titanium, tin, zirconium, and hafnium.

11. The ceramic foam of claim 2, wherein said ceramic material includes at least one filler material incorporated therein.

12. The ceramic foam of claim 3, wherein said ceramic material includes at least one filler material incorporated therein.

13. The ceramic foam of claim 10, wherein said ceramic material includes at least one filler material incorporated therein.

14. The ceramic foam of claim 1, wherein said at least one of a solid oxidant and a liquid oxidant comprises at least one solid oxidant comprising a material selected from the group consisting of boron, carbon, silicon dioxide, borides, and combinations thereof.

15. The ceramic foam of claim 1, wherein said at least one of a solid oxidant and a liquid oxidant comprises a liquid oxidant comprising at least one low-melting glass.

* * * * *